United States Patent
Rajagopalan

(10) Patent No.: US 6,747,110 B2
(45) Date of Patent: Jun. 8, 2004

(54) GOLF BALLS COMPRISING NON-IONOMERIC FLUOROPOLYMER

(75) Inventor: Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/171,355

(22) Filed: Jun. 13, 2002

(65) Prior Publication Data

US 2003/0236353 A1 Dec. 25, 2003

(51) Int. Cl.$^7$ .............................................. A63B 37/12
(52) U.S. Cl. .................... 526/254; 526/255; 473/354; 473/357; 473/374; 473/378
(58) Field of Search .............................. 526/254, 255; 473/354, 357, 374, 378

(56) References Cited

U.S. PATENT DOCUMENTS

| | | | |
|---|---|---|---|
| 4,138,426 A | 2/1979 | England .................. 260/465.6 |
| 4,452,998 A | 6/1984 | Griffith et al. .............. 560/221 |
| 5,426,165 A | 6/1995 | Kruger et al. .............. 526/247 |
| 5,654,373 A | 8/1997 | Kruger et al. ............ 525/326.3 |
| 5,820,488 A | 10/1998 | Sullivan et al. ............. 473/374 |
| 5,885,172 A | 3/1999 | Hebert et al. ............... 473/354 |
| 5,962,140 A | 10/1999 | Rajagopalan ............... 428/421 |
| 5,981,654 A | * 11/1999 | Rajagopalan ................ 525/66 |
| 5,981,673 A | 11/1999 | DeSimone et al. ........... 526/89 |
| 6,132,324 A | 10/2000 | Hebert et al. ............... 473/378 |
| 6,133,389 A | 10/2000 | Anolick et al. ............. 526/206 |
| 6,162,135 A | 12/2000 | Bulpett et al. .............. 473/373 |
| 6,177,196 B1 | 1/2001 | Brothers et al. ............ 428/422 |
| 6,210,294 B1 | 4/2001 | Wu ............................ 473/377 |
| 6,217,464 B1 | 4/2001 | Chang ....................... 473/378 |
| 6,232,389 B1 | 5/2001 | Feeney et al. .............. 524/450 |
| 6,232,400 B1 | * 5/2001 | Harris et al. ................ 525/176 |
| 6,274,669 B1 | 8/2001 | Rajagopalan ................ 525/64 |
| 6,287,216 B1 | 9/2001 | Boehm ....................... 473/354 |
| 6,291,592 B1 | 9/2001 | Bulpett et al. .............. 525/248 |
| 6,300,445 B1 | 10/2001 | Hung et al. ................. 526/248 |
| 6,371,870 B1 | 4/2002 | Calabria et al. ............ 473/370 |
| 6,392,002 B1 | 5/2002 | Wu ............................. 528/76 |

* cited by examiner

*Primary Examiner*—David J. Buttner
(74) *Attorney, Agent, or Firm*—William B. Lacy

(57) ABSTRACT

A golf ball comprising a core, a cover, and an intermediate layer disposed between the core and the cover, wherein the intermediate layer comprises a non-ionomeric fluoropolymer having a formula:

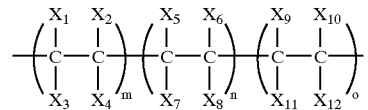

wherein $X_1$ to $X_{12}$ are hydrogen, fluorine, chlorine, bromine, iodine, $CH_3$, $CF_3$, linear or branched alkyl group, partially fluorinated or perfluorinated alkyl group, linear or branched alkoxy group, partially fluorinated or perfluorinated alkoxy group, aromatic, or alicyclic; at least one of $X_1$ to $X_4$ comprises a fluorine; m ranges from 100 to 1 percent by weight of the fluoropolymer; n ranges from 0 to 50 percent by weight of the fluoropolymer; and o ranges from 0 to 35 percent by weight of the fluoropolymer.

24 Claims, No Drawings

GOLF BALLS COMPRISING NON-IONOMERIC FLUOROPOLYMER

FIELD OF THE INVENTION

This invention relates generally to golf balls, and more specifically, to a multi-layer golf ball and a composition therefore comprising at least one non-ionomeric fluoropolymer.

BACKGROUND OF THE INVENTION

Solid core golf balls are well known in the art. Typically, the core is made from polybutadiene rubber material, which provides the primary source of resiliency for the golf ball. A known drawback of polybutadiene cores cross-linked with peroxide and/or zinc diacrylate is that this material is adversely affected by absorption of water vapor, which reduces the resiliency of the cores and degrades their properties. Thus, these cores must be covered quickly to maintain optimum ball properties. A cover that protects the core from the elements and repeated impacts from golf clubs is typically made from ionomer resins, balata, and urethane, among other materials. Ionomer covers, particularly hard ionomers, offer some protection against the absorption of water vapor. However, it is more difficult to control or impart spin to balls with hard covers. Conventional urethane covers provide better ball control but offer less resistance to water vapor than ionomer covers.

Prolonged exposure to high humidity and elevated temperature may be sufficient to allow water vapor to invade the cores of some commercially available golf balls. For example, at 38° C. and 90% humidity over a sixty day period, significant amounts of moisture enter the cores and reduce the initial velocity of the balls by 1.8 ft/s to 4.0 ft/s or greater. The change in compression may be reduced by 5% or more. The absorbed water vapor also reduces the golf ball coefficient of restitution ("COR"). When a golf ball is subjected to prolonged storage and/or use under ambient conditions such as 25–35% RH, as well as conditions of high temperature and high humidity, the COR of the golf ball tends to decrease over time due to water vapor absorption.

Several prior patents have addressed the water vapor absorption problem. U.S. Pat. No. 5,820,488 discloses a golf ball having a water vapor barrier ("WVB") layer disposed between a core and a cover. The WVB layer may comprise polyvinylidene chloride ("PVDC") or vermiculite. It can also be formed by an in situ reaction between a barrier-forming material and the outer surface of the core. U.S. Pat. Nos. 5,885,172 and 6,132,324 disclose, among other things, a golf ball with a polybutadiene or wound core having an ionomer inner cover and a relatively soft outer cover. The hard ionomer inner cover offers some resistance to water vapor absorption, while the soft outer cover provides desirable ball control. U.S. Pat. No. 6,232,389 discloses the application of a dispersed exfoliated layered filler in an elastomeric polymer based barrier coating mixture so as to reduce water vapor permeability in golf balls and other objects by at least 5-fold. Preferable fillers include layered silicates such as bentonite and vermiculite. U.S. Pat. No. 6,287,216 discloses a wounded golf ball having a liquid center surrounded by a thermoplastic core layer formed of a hydrophobic material that has a water vapor permeation rate of less than about 170 g·mil/100 in²·24 h.

Prior art referenced above typically resort to the incorporation of a WVB material in an existing layer or a designated WVB layer to overcome the water vapor absorption problem in golf balls, escalating manufacturing cost and construction complexity. It is therefore desirable to provide cost-effective material compositions that have general characteristics suitable for golf ball constructions with concomitant WVB properties.

One particular class of polymers suitable for golf ball compositions of the present invention is fluoropolymers. Fluoropolymers are well known for their excellent resistance to outdoor weathering and ultraviolet irradiation, high degree of physical toughness, chemical inertness, water and gas impermeability, low moisture absorption, good abrasion resistance, non-tackiness, resistance to soiling, as well as a significant retention of these properties at both low and elevated temperatures. This rare combination is due to the strength of the C-F bond, one of the most stable bonds known. Other desirable properties of the fluoropolymers include high elongation, low coefficient of friction, low wear rate, good resistance to swell in solvents, low refractive index, and low dielectric constant. These desirable properties allow the fluoropolymers to be widely used as self-supporting layers or outer coatings on various substrates.

Disclosures of fluoropolymer applications in golf ball compositions, however, are limited. U.S. Pat. No. 5,962,140 describes a golf ball having a core and/or an intermediate layer comprising a functionalized fluoropolymer wherein the fluoropolymer may be an ionomeric perfluoropolymer that is sulfonated or carboxylated or a derivative thereof. U.S. Pat. No. 6,133,389 discloses amorphous tetrafluoroethylene-hexafluoropropylene ("TFE-HFP") dipolymers, and other copolymers containing TFE, HFP and a third monomer, useful as coatings for golf balls. U.S. Pat. No. 6,217,464 discloses a golf ball having a lubricating material on its surface for reducing the spin imparted by a striking golf club. The lubricating material may be fluoropolymer, and the coating thickness is less than about 0.010 inches.

There remains a need, however, for further development of golf ball compositions comprising fluoropolymers, particularly non-ionomeric fluoropolymers ("NIFP"), in multi-layer golf ball constructions.

SUMMARY OF THE INVENTION

The present invention is directed in general to golf ball, and particularly to golf ball compositions and constructions. Specifically, the invention is direct to a multi-layer golf ball comprising a core, a cover, and an intermediate layer disposed between the core and the cover, wherein the intermediate layer comprises a non-ionomeric fluoropolymer having a formula:

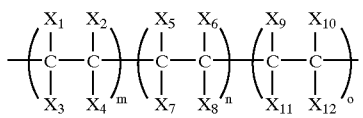

wherein $X_1$ to $X_{12}$ are hydrogen, fluorine, chlorine, bromine, iodine, $CH_3$, $CF_3$, linear or branched alkyl group, partially fluorinated or perfluorinated alkyl group, linear or branched alkoxy group, partially fluorinated or perfluorinated alkoxy group, aromatic, or alicyclic; at least one of $X_1$ to $X_4$ comprises a fluorine; m ranges from 100 to 1 percent by weight of the NIFP; n ranges from 0 to 50 percent by weight of the NIFP; and o ranges from 0 to 35 percent by weight of the NIFP.

The NIFP may be a homopolymer, copolymer, or terpolymer comprising one or more non-ionomeric fluoromonomers. Suitable non-ionomeric fluoromonomers are partially fluorinated or perfluorinated ethylenic monomers and include, but are not limited to, fluorinated olefins of from about 1 to about 12 carbon atoms, such as vinylidene fluoride, vinyl fluoride, hexafluoropropylene, pentafluoropropylene, tetrafluoropropylene, trifluoropropylene, difluoropropylene, tetrafluoroethylene, trifluoroethylene, 1,2-difluoroethylene, chlorotrifluoroethylene, 1,2-dichlorodifluoroethylene, 1-chloro-1-fluoroethylene, and perfluorobutyl ethylene; fluorinated alkyl α-olefins such as 3,3,3,4,4-pentafluoro-1-butene, 3,3,3-trifluoropropene, 1-hydropentafluoropropene, 2-hydropentafluoropropene, and 2-trifluoromethyl-3,3,3-trifluoro-1-propene; fluorinated vinyl ethers of from about 1 to about 8 carbon atoms, such as perfluoro (methylvinylether), perfluoro(ethylvinylether) and perfluoro (propylvinylether); perfluorodioxoles of from about 1 to about 10 carbon atoms, such as perfluoro(1,3-dioxole) and perfluoro(2,2-dimethyl-1,3-dioxole); fluorinated dienes of from about 1 to about 8 carbon atoms, such as fluorinated derivatives of 1,4-butadiene and cis-isoprene, fluorinated acrylics including 1,1-dihydropentadecafluorooctylacrylate and 1,1-dihydropentadienefluorooctylacrylate; perfluoralkoxy; fluorosilicons; perfluorocyclics; and mixtures thereof. Preferred NIFP's for the golf ball compositions of the present invention are vinylidene fluoride homopolymer, vinylidene fluoride/hexafluoropropylene copolymer, and vinylidene fluoride/hexafluoropropylene/tetrafluoroethylene terpolymer.

In accordance with conventional fluoropolymer chemistry, the NIFP of the invention may further comprise cure site monomers; ionomeric fluoropolymers, chain transfer agents; peroxide curatives; amine curatives; bisphenol curatives; cross-linking agents; redox initiators; co-curing agents; dispersion fillers; density-modifying fillers; foaming agents; antioxidants; reinforcing agents; plasticizers; lubricants; processing aids; pigments and dyes; and mixtures thereof. The NIFP can also blend with a thermoplastic material to form the intermediate layer in golf balls. Suitable thermoplastic materials include without limitation polyesterester block copolymers, polyetherester block copolymers, polyetheramide block copolymers, partially or fully neutralized ionomer resins, dynamically vulcanized thermoplastic elastomers, hydrogenated styrene-butadiene elastomers with functional groups attached, thermoplastic polyurethanes, thermoplastic polyesters, metallocene polymers; styrene-propylene-diene rubbers; polybutadienes; chloroprene rubbers; acrylonitrile rubbers; acrylonitrile-butadiene rubbers; ethylene/proprylene/diene terpolymers; polypropylene resins; epoxy; polyurea; styrene-ethylene block copolymers; maleic anhydride or succinate modified metallocene catalyzed ethylene copolymers; chlorinated polyethylenes; polysulfide rubbers; fluorocarbons; polymethylmethacrylate, and mixtures thereof. In one embodiment of the present invention, the intermediate layer comprises about 10% to about 75% by weight of the NIFP, about 0% to about 25% by weight of the thermoplastic material, and about 0% to about 50% by weight of a density-modifying filler.

Preferably, the NIFP-based intermediate layer has a flexural modulus between about 30,000 psi and about 150,000 psi, more preferably between about 55,000 psi and about 75,000 psi; a material hardness between about 25 and about 75 Shore D, more preferably between about 50 and about 70 Shore D; a thickness between about 0.005 inches and about 0.085 inches, more preferably between about 0.030 inches and about 0.060 inches; an outer diameter between about 1.500 inches and about 1.650 inches, more preferably between about 1.550 inches and about 1.640 inches. The intermediate layer may further comprise a density-reducing filler to adjust its specific gravity to between about 0.90 and about 1.50. In one embodiment, the intermediate layer is either an outer core layer or an inner cover layer.

In another embodiment of the present invention, the core comprises a center and at least one outer core layer. Optionally, the at least one outer core layer also comprises a NIFP. The center may be solid, hollow, liquid-filled, gel-filled, or gas-filled, while the outer core layer may be a wound layer. Preferably, the core has a compression of less than about 60 and a Shore D hardness of less than about 60.

In a further embodiment, the cover comprises an outer cover layer and at least one inner cover layer. Optionally, the at least one inner cover layer comprises a NIFP. Cover materials of the present invention are typically thermoplastic or thermosetting materials, used alone or blended with the optional NIFP. Suitable materials for forming the cover layers include, but are not limited to, partially or fully neutralized ionomer resins; epoxy; polyurethanes; balata; vinyl resins; polyolefins; polyureas; polyamides; acrylic resins and blends thereof; block copolymers; copoly(ether-amide); polyphenylene oxide resins and blends thereof, thermoplastic polyesters; and mixtures thereof.

The present invention further directs to a two-piece golf ball comprising a core and a cover. Preferably, the cover comprises a NIFP as described herein, such as vinylidene fluoride homopolymer, vinylidene fluoride/hexafluoropropylene copolymer, or vinylidene fluoride/hexafluoropropylene/tetrafluoroethylene terpolymer. A thermoplastic or thermosetting material may be blended with the NIFP to form the cover, including partially or fully neutralized ionomer resins; epoxy; polyurethanes comprising polyols and polyisocyanates; balata; vinyl resins; polyolefins; polyureas; polyamides; acrylic resins and blends thereof, block copolymers; copoly(ether-amide); polyphenylene oxide resins and blends thereof; thermoplastic polyesters; blends and alloys including polycarbonate with acrylonitrile butadiene styrene and polyvinyl chloride with acrylonitrile butadiene styrene; blends of thermoplastic rubbers with polyethylene and propylene; and mixtures thereof. Other conventional additives for golf ball cover may be incorporated herein. Such additives include without limitation antioxidants; catalysts; colorants including pigments and dyes; hindered amine light stabilizers; optical brighteners; UV absorbers; fillers; metals; plasticizers; surfactants; viscosity modifiers; compatibility agents; dispersing agents; foaming agents; reinforcement agents; release agents; and mixtures thereof. Optionally, the core of the two-piece golf ball may comprise a center and at least one outer core layer.

In yet another embodiment of the present invention, a three-piece golf ball comprises a core, a cover, and an intermediate layer disposed between the core and the cover. At least one of the intermediate layer or the cover comprises a NIFP having a water absorption of less than about 0.07%. Preferably, the core has a compression of less than about 60, and the intermediate layer has a material hardness greater than that of the cover by at least about 10 Shore D.

DEFINITIONS

The following terms that are used in this application are defined in terms of the enumerated ASTM tests: Specific Gravity ASTM D-297, Flexural Modulus ASTM D-790, Shore D Hardness ASTM D-2240, and Shore C Hardness ASTM D-2240. The ASTM D-297 test was carried out in lab conditions where the temperature was controlled to 20–23° C.

As used herein, the terms "points" and "compression points" refer to the compression scale or the compression scale based on the ATTI Engineering Compression Tester. This scale, which is well known to those working in this field, is used in determining the relative compression of a core or ball.

As used herein, "COR" refers to Coefficient of Restitution, which is obtained by dividing a ball's rebound velocity by its initial (i.e., incoming) velocity. This test is performed by firing the samples out of an air cannon at a vertical steel plate over a range of test velocities (from 75 to 150 ft/s). A golf ball having a high COR dissipates a smaller fraction of its total energy when colliding with the plate and rebounding therefrom than does a ball with a lower COR. Unless otherwise noted, the COR values reported herein are the values determined at an incoming velocity of 125 ft/s.

As used herein, the terms "fluoropolymer" and "fluorinated polymer" is defined as any themoplastic and/or elastomeric homopolymer, copolymer, terpolymer, or mixture thereof, having at least one fluorine in at least one of the monomer repeat units in the polymer.

As used herein, the terms "fluoromonomer" and "fluorinated monomer" refer to compounds containing an ethylinic group that may be free-radically polymerized and that contain at least one fluorine atom, fluoroalkyl group, or fluoroalkoxy group attached to the ethylinic group that undergoes polymerization.

As used herein, the term "copolymer" refers to a polymer which is formed from two or more monomers, wherein the monomers are not identical.

As used herein, the term "terpolymer" refers to a polymer which is formed from three monomers, wherein the monomers are not identical.

As used herein, the term "fillers" includes any compound or composition that can be used to vary the density and other properties of the subject golf ball cores.

As used herein, the term "pph" in connection with a batch formulation refers parts by weight of the constituent per hundred parts of the base composition (e.g., elastomer).

The term "about," as used herein in connection with one or more numbers or numerical ranges, should be understood to refer to all such numbers, including all numbers in a range.

DETAILED DESCRIPTION OF THE INVENTION

The golf balls of the present invention may comprise any of a variety of constructions, such as a two-piece, three-piece, multi-layer, or wound ball having a variety of cores, intermediate layers, covers, and coatings. The covers and cores of the present invention include structures comprising one or more layers. Cores may include a single, unitary layer, comprising the entire core from the center of the core to its outer periphery, or may contain a center surrounded by at least one outer core layer. The center, the innermost portion of the core, is preferably solid, but may be hollow or liquid-, gel-, or gas-filled. The outer core layer may also be a wound layer formed of a tensioned elastomeric material. Cover layers of the present invention may also contain one or more layers, such as a double cover comprising an inner and outer cover layer. Optionally, an intermediate layer disposed between the core and cover may be incorporated. The intermediate layer, if present, may comprise one or more layers, and are sometimes referred to in the art, and, thus, herein as well, as inner cover layers, outer core layers, or mantle layers.

Any of the core, cover, or the intermediate layer components may be formed of or include a NIFP, but preferably, at least one of the outer core layer, intermediate layer, inner cover layer, or outer cover layer comprises a NIFP.

The NIFP may be a homopolymer, a copolymer, a terpolymer, or a mixture thereof that comprises at least one non-ionomeric fluoromonomer. Preferably, the NIFP of the present invention has a formula:

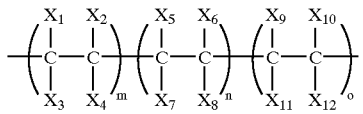

wherein $X_1$ to $X_{12}$ are hydrogen, fluorine, chlorine, bromine, iodine, $CH_3$, $CF_3$, linear or branched alkyl group, partially fluorinated or perfluorinated alkyl group, linear or branched alkoxy group, partially fluorinated or perfluorinated alkoxy group, aromatic, or alicyclic; at least one of $X_1$ to $X_4$ comprises a fluorine; m ranges from 100 to 1 percent by weight of the NIFP; n ranges from 0 to 50 percent by weight of the NIFP; and o ranges from 0 to 35 percent by weight of the NIFP.

Non-ionomeric fluoromonomers of the present invention typically are partially fluorinated and perfluorinated ethylenic monomers. Examples of such fluoromonomers include, but are not limited to, partially fluorinated and perfluorinated olefins of from about 1 to about 12 carbon atoms such as vinylidene fluoride ("VDF"); vinyl fluoride ("VF"), hexafluoropropylene ("HFP"); pentafluoropropylene ("PFP"); tetrafluoropropylene; trifluoropropylene ("TFP"); difluoropropylene; tetrafluoroethylene ("TFE"); trifluoroethylene; 1,2-difluoroethylene; chlorotrifluoroethylene ("CTFE"); 1,2-dichlorodifluoroethylene; 1-chloro-1-fluoroethylene; perfluorobutyl ethylene ("PFBE"); fluorinated alkyl α-olefins such as 3,3,3,4,4-pentafluoro-1-butene; 3,3,3-trifluoropropene; 1-hydropentafluoropropene; 2-hydropentafluoropropene; 2-trifluoromethyl-3,3,3-trifluoro-1-propene; fluorinated vinyl ethers of from about 1 to about 8 carbon atoms such as perfluoro(methylvinylether) ("PMVE"); perfluoro(ethylvinylether) ("PEVE"); perfluoro(propylvinylether) ("PPVE"); perfluorodioxoles of from about 1 to about 10 carbon atoms such as perfluoro(1,3-dioxole) and perfluoro(2,2-dimethyl-1,3-dioxole) ("PDD"); partially fluorinated and perfluorinated dienes of from about 1 to about 8 carbon atoms such as fluorinated derivatives of 1,4-butadiene and cis-isoprene; perfluoralkoxy ("PFA"); fluorosilicons; perfluorocyclics; fluorinated acrylics such as 1,1-dihydropentadecafluorooctylacrylate and 1,1-dihydropentadienefluorooctylacrylate; and mixtures thereof. Other suitable fluoromonomers for the invention are described in U.S. Pat. Nos. 6,177,196; 5,981,673; 5,654,373; 5,426,165; 4,138,426; and 4,452,998, the disclosures of which are incorporated herein by reference in their entirety.

The non-inonomeric fluoromonomers enlisted above may be polymerized alone to form a NIFP homopolymer if the fluoromonomer can be homopolymerized. Alternatively, the non-ionomeric fluoromonomer may be polymerized with one or more other fluoromonomers or other fluorine-free monomers to form a copolymer, or terpolymer. Suitable fluorine-free monomers include without limitation substituted and unsubstituted olefins of from about 1 to about 12 carbon atoms such as ethylene and propylene and isobutylene; vinyl esters of from about 1 to about 12 carbon atoms such as vinyl acetate and vinylpropionate; dienes of from about 1 to about 8 carbon atoms such as 1,4-butadiene and cis-isoprene; and mixtures thereof. A preferred NIFP homopolymer for the invention is polyvinylidene fluoride ("PVDF"), a preferred NIFP copolymer is VDF-HFP copolymer, and a preferred NIFP terpolymer is VDF-HFP-TFE terpolymer.

The NIFP's of this invention may include any cure site monomers and their halogenated derivatives commonly used in fluoropolymers, including but not limited to the non-ionomeric fluoromonomers listed above and derivatives thereof, as well as brominated and iodinated olefins such as 4-bromotetrafluorobutene-1, bromotrifluoroethylene, 4-iodotetrafluorobutene-1, and iodotrifluoroethylene. The NIFP may further be blended with ionomeric fluoropolymers of U.S. Pat. Nos. 6,300,445 and 5,962,140, the disclosures of which are incorporated herein by reference in their entirety. Other additives may also be added to the NIFP to enhance processability or various physical properties, such as tensile strength, flexural modulus, or water resistance. As known to one of ordinary skill in the art, such additives include without limitation chain transfer agents, peroxide curatives, amine curatives, bisphenol curatives, cross-linking agents, redox initiators, co-curing agents, dispersion fillers, density-modifying fillers, foaming agents, antioxidants, reinforcing agents, plasticizers, lubricants, processing aids, pigments and dyes, and mixtures thereof.

Most of the above mentioned NIFP's are commercially available or can be prepared by methods well known in the art. For example, Atofina Chemicals, Inc. supplies VDF homopolymers under the trademark of Kynar® PVDF, VDF-HFP copolymers under the trademarks of Kynar Flex® and Kynar SuperFlex®, fluorinated acrylic copolymers under the trademark of Foraperle®, and CTFE homopolymers under the trademark of Voltalef®. E. I. du Pont de Nemours and Company produces TFE homopolymers under the trademark of Teflon® PTFE, TFE-PPVE copolymers under the trademark of Teflon® NXT, ethylene-TFE copolymer under the trademark of Tefzel® ETFE, TFE-HFP copolymers under the trademark of Teflon® FEP, fluoroelastomers such as VDF-HFP copolymers under the trademark of Viton®, PFA copolymers under the trademark of Teflon® PFA, perfluorocyclopolymers under the trademark of Teflon® AF, and perfluoroelastomers under the trademark of Kalrez®. 3M provides VDF-HFP copolymers and VDF-HFP-TFE terpolymers under the trademark of Dyneon®. Ausimont supplies VDF homopolymers under the trademark of Hylar®, VDF-HFP copolymers and VDF-HFP-TFE terpolymers under the trademark of Tecnoflon®, ethylene-CTFE copolymers under the trademark of Halar®, modified ethylene-CTFE under the trademark of Vatar®, TFE-PFA copolymers and PFA homopolymers under the trademark of Hyflon®, and TFE homopolymers under the trademarks of Algoflon® and Polymist®. Daikin Industries, Ltd. produces VDF homopolymers under the trademark of Neoflon® PVDF, VDF-HFP copolymers and VDF-HFP-TFE terpolymers under the trademark of Dai-El®, TFE homopolymers under the trademark of Polyflon® PTFE, TFE-PAVE copolymers under the trademark of Neoflon® PFA, TFE-HFP copolymers under the trademark of Neoflon® FEP, and CTFE homopolymers under the trademark of Neoflon® PCTFE. Asahi Glass Company manufactures ethylene-TFE copolymers, TFE homopolymers, and PFA homopolymers under the trademark of Fluon®, FEVE alternating copolymers under the trademark of Lumiflon®, propylene-TFE alternating copolymers under the trademark of Aflas®, and amorphous perfluorocyclopolymers under the trademark of Cytop®. Other commercial NIFP's include TFE-based fluoropolymers the trademarks of Lubriflon® and Valflon® available from Dixon Resine. Preferably the NIFP's for the present invention are VDF homopolymers and VDF-HFP copolymers available from Atofina Chemicals, Inc. under the trademark of Kynar Flex®. Specific examples and their properties are listed in Table I below.

TABLE I

Physical and mechanical properties of Kynar Flex ® PVDF

| Properties | Series 2500 | Series 2750/ 2950 | Series 2800/ 2900 | Series 2850 | Series 3120 |
|---|---|---|---|---|---|
| Specific Gravity | 1.80– 1.82 | 1.78– 1.80 | 1.76– 1.79 | 1.76– 1.79 | 1.76– 1.79 |
| Water Absorption (%) | 0.04– 0.07 | 0.04– 0.07 | 0.03– 0.05 | 0.03– 0.05 | 0.03– 0.05 |
| Flexural Modulus (psi) | 28,000– 36,000 | 49,000– 58,000 | 90,000– 120,000 | 160,000– 180,000 | 90,000– 120,000 |
| Hardness (Shore D) | 55– 60 | 62– 67 | 65– 70 | 70– 75 | 65– 70 |

In one embodiment of the present invention, the intermediate layer is formed from a composition comprising at least one NIFP described above and a thermoplastic material. Suitable thermoplastic materials for use in the intermediate layer composition include, but are not limited to, polyester-ester block copolymers, polyetherester block copolymers, polyetheramide block copolymers, partially or fully neutralized ionomer resins, dynamically vulcanized thermoplastic elastomers, hydrogenated styrene-butadiene elastomers with functional groups such as maleic anhydride or sulfonic acid attached, thermoplastic polyurethanes, thermoplastic polyesters, polymers formed using a metallocene catalyst ("metallocene polymers"); styrene-propylene-diene rubbers; polybutadienes; chloroprene rubbers; acrylonitrile rubbers; acrylonitrile-butadiene rubbers; EPDM; polypropylene resins; epoxy; polyureas; styrene-ethylene block copolymers; maleic anhydride or succinate modified metallocene catalyzed ethylene copolymers; chlorinated polyethylenes; polysulfide rubbers; fluorocarbons such as hexafluoroacetone; polymethylmethacrylate ("PMMA"), and blends thereof Any of these materials having one or more acidic or ionic moieties may be partially or fully neutralized, preferably by at least about 40%, more preferably by at least about 70%, and most preferably by about 100%.

Suitable thermoplastic polyetheresters include Hytrel® 3078, G3548W and G4078W from E. I. du Pont de Nemours and Company. Suitable thermoplastic polyetheramides include Pebax® 2533, 1205 and 4033 from Atofina Chemicals, Inc. Suitable thermoplastic ionomer resins include any number of olefinic based ionomers such as Surlyn® and Iotek®. Suitable dynamically vulcanized thermoplastic elastomers include Santoprene®, Sarlink®, Vyram®, Dytron®, and VistaFlex®. Examples of suitable functionalized hydrogenated styrene-butadiene elastomers having functional groups such as maleic anhydride or sulfonic acid, include Kraton® FG-1901x and FG-1921x from Shell Corporation. Examples of suitable thermoplastic polyurethanes include Estane® 58133, 58134 and 58144 from B. F. Goodrich Company. Suitable metallocene-catalyzed polymers include those commercially available from Sentinel Products. Suitable thermoplastic polyesters include poly (butylene terephthalate), poly(ethylene terepthalate), and poly(trimethylene terepthalate). Preferably the thermoplastic material of the intermediate layer composition is a polyetherester block copolymer, with Hytrel® 3078 being a particularly preferred polyetherester block copolymer.

In accordance to the present invention, the NIFP homopolymers, copolymers and terpolymers described herein may be used in forming any golf ball component layers such as outer core layers and intermediate layers, as well as in covers, including inner and outer cover layers. The intermediate layers of the present invention are formed from an intermediate layer composition comprising up to 100% by weight of a NIFP. In one embodiment of the present invention, the intermediate layer is formed from a composition of about 1% to about 99% by weight of a NIFP, about 0% to about 75% by weight of a thermoplastic as describe above, and about 0% to about 50% by weight of a density-modifying filler such as zinc oxide. In another embodiment, the intermediate layer is formed from a composition of about 10% to about 75% by weight of a NIFP, about 0% to about 25% by weight of a thermoplastic, and about 5% to about 40% by weight of zinc oxide. Most preferably, the intermediate layer of the present invention comprises about 100% of a NIFP.

It is preferred that the NIFP used in the intermediate layers of the present invention has a flexural modulus of greater than about 10,000 psi, more preferably between about 30,000 psi and about 150,000 psi and, most preferably, between about 55,000 psi and about 75,000 psi. This is particularly desirable when the intermediate layer is an inner cover layer for a golf ball with a double-cover construction. Additionally, it is preferred that the NIFP has a Shore D hardness of between about 25 and about 75 and, more preferably, between about 50 and about 70. NIFP's of this nature include Kynar Flex® Series 2750 and 2800 from Atofina Chemicals, Inc.

The intermediate layers employed in the golf balls of the present invention preferably have a thickness from about 0.005 inches to about 0.125 inches, more preferably about 0.005 inches to about 0.085 inches, and most preferably about 0.030 inches to about 0.060 inches. The outer diameter of the intermediate layers is preferably between about 1.500 inches and about 1.650 inches, more preferably between about 1.550 inches and about 1.640 inches.

The compositions of the present invention may also include fillers to adjust the density and/or specific gravity of the intermediate layer to a range of from about 0.90 to about 3.00. To increase the density of the NIFP (typically about 1.80 for Kynar Flex® PVDF), suitable fillers are generally inorganic, and include numerous metals or metal oxides and salts such as tungsten, tungsten carbide, zinc oxide, tin oxide, calcium oxide, barium sulfate, zinc sulfate, calcium carbonate, barium carbonate, zinc carbonate, as well as clay, an array of silicas, regrind (recycled core material typically ground to about 30 mesh particle), high-Mooney-viscosity rubber regrind, and mixtures thereof. Alternatively, fillers having a specific gravity less than that of the NIFP may be used to reduce the specific gravity of the intermediate layer Such density-reducing fillers include foaming agents, blowing agents, micro balloons, cellular foams and other materials having a relatively large void volume. Typically, such fillers have a specific gravity less than 1.00. Fillers may also include various polymers, ceramics, and glass microspheres that are solid or hollow, and filled or unfilled, all of which are readily selected by one of ordinary skill in the art. The preferred range of specific gravity for golf ball intermediate layers of the present invention is from about 0.90 to about 1.50, more preferably from about 1.20 to about 1.30. The specific gravity of the golf ball depends upon the size of the finished ball and the size and specific gravity of the core, the intermediate layer(s), and the cover.

The NIFP-based compositions for the intermediate layers of the present invention may be extruded as thin threads and wound about a solid core or a liquid-filled core to form a wound intermediate layer. Preferably the intermediate layer is compression or injection molded about the core. Alternatively, pre-formed intermediate layer half shells are adhered onto the core using an adhesive. For proper adhesion, the adhesives include, but are not limited to, silane coupling agents; two-part adhesive of poly(VDF-HFP) and ketenes; polytetrafluoroethylene; fluoroethylene-propylene; high molecular weight polyethylene and polypropylene; perfluoroacrylate; PVDF; VDF-HFP-TFE terpolymer; polychlorotrifluoroethylene; epichlorohydrin rubber with organic phosphonium; and mixtures thereof. The inner adhesion side of the intermediate layers may be treated to improve wettability by using any suitable conventional processes such as flame treatment, corona treatment, or chemical treatment. These processes tend to convert the surface of the NIFP intermediate layers from a relatively low energy surface to a high energy, partially oxidized surface, which in turn improves adhesion.

The golf ball cover of the present invention is preferably tough, cut-resistant, and selected from conventional materials used as golf ball covers based on the desired performance characteristics. The cover may comprise one or more layers including an outer cover layer and at least one inner cover layer. These layers may comprise thermoplastic and/or thermosetting materials include, without limitation, partially or fully neutralized ionomer resins; epoxy; polyurethanes comprising polyols and polyisocyanates; balata; vinyl resins; polyolefins; polyureas; polyamides such as poly(hexamethylene adipamide) and poly(caprolactam); acrylic resins and blends thereof; block copolymers such as styrene-butadiene rubber and isoprene- or ethylene-butylene rubber; copoly(ether-amide) such as Pebax®; polyphenylene oxide resins and blends thereof such as Noryl®; thermoplastic polyesters such as Hytrel® and Lomod®; blends and alloys including polycarbonate with acrylonitrile butadiene styrene and polyvinyl chloride with acrylonitrile butadiene styrene; blends of thermoplastic rubbers with polyethylene and propylene; and mixtures thereof. Conventional additives for the cover layer compositions include, but are not limited to, antioxidants; catalysts; colorants including pigments and dyes; hindered amine light stabilizers; optical brighteners; UV absorbers; fillers; metals; plasticizers; surfactants; viscosity modifiers; compatibility agents; dispersing agents; foaming agents; reinforcement agents; release agents; and mixtures thereof. Such additives may be incorporated in any amounts that will achieve their desired purpose.

To minimize water vapor adsorption into the golf ball, it is desirable that the cover of the golf balls has water vapor barrier property. While many WVB materials disclosed in prior art may be incorporated into the cover, it is preferred that the WVB material for golf ball covers of the present invention is a NIFP as described above. A compatibilizer may be needed to blend the NIFP with the cover materials mentioned above. Examples of the compatibilizer are described in U.S. Pat. No. 6,274,669, the disclosure of which is incorporated herein by reference in its entirety. The cover may comprise a single cover layer, or an outer cover layer and at least one inner cover layer. In one embodiment of the present invention, at least one of the cover layers is formed from a composition of about 1% to about 99% by weight of a NIFP, about 10% to about 50% by weight of a thermoplastic or thermosetting material such as an partially or fully neutralized ionomer resin or a polyurethane, and about 0% to about 15% by weight of a compatibilizer. Preferably, the cover of the present invention comprises about 100% of a NIFP.

Partially or fully neutralized ionomer resins for the golf ball covers include copolymers or terpolymers of ethylene and an unsaturated monocarboxylic acid with an optional softening comonomer such as acrylate or methacrylate. The carboxylic acid groups in these ionomers include acrylic, methacrylic, crotonic, maleic, fumaric or itaconic acid partially or fully neutralized by a cation such as lithium, sodium, potassium, zinc, magnesium, calcium, barium, lead, tin, aluminum, or a combination thereof, with lithium, sodium and zinc being preferred. Specific ionomers preferably include ethylene/(meth)acrylic acid, ethylene/(meth) acrylic acid/n-butyl acrylate, ethylene/(meth)acrylic acid/ ethyl acrylate, and ethylene/(meth)acrylic acid/methyl acrylate, commercially available as Surlyn® from E. I. du Pont de Nemours and Company, and as Ioteck® from Exxon.

Suitable polyurethanes for golf ball covers of the present invention include those disclosed in U.S. Pat. Nos. 6,392, 002, 6,371,870 and 6,210,294, incorporated herein by reference in their entirety, and generally comprise the reaction product of at least one polyisocyanate, polyol, and at least one curing agent. Any polyisocyanate available to one of ordinary skill in the art may be used in accordance with the invention, preferably including, but is not limited to, 4,4'-diphenylmethane diisocyanate ("MDI"); polymeric MDI; carbodiimide-modified liquid MDI; 4,4'-dicyclohexylmethane diusocyanate ("$H_{12}$MDI"); p-phenylene diisocyanate ("PPDI"); m-phenylene diusocyanate ("MPDI"); toluene diisocyanate ("TDI"); or a mixture thereof. It is well understood in the art that the hardness of polyurethane is correlated to the percent of unreacted NCO groups in the polyisocyanate. Preferably, the at least one polyisocyanate has less than about 14% unreacted NCO groups, more preferably less than about 7.5%, and more preferably less than about 7.0%.

Any polyol available to one of ordinary skill in the art is suitable for use according to the invention, having saturated or unsaturated bonds, or substituted or unsubstituted aromatic and cyclic groups in the hydrocarbon chain. Exemplary polyols include, but are not limited to, polyether polyols, polyester polyols, polycaprolactone polyols, and polycarbonate polyols. Suitable polyether polyols include, but are not limited to, polytetramethylene ether glycol ("PTMEG"), polyethylene propylene glycol, polyoxypropylene glycol, and mixtures thereof. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. Suitable polycarbonates include, but are not limited to, polyphthalate carbonate and poly (hexamethylene carbonate) glycol. Preferably, the polyol of the present invention includes PTMEG.

The curing agent may be an amine, a hydroxyl-terminated curative, or a mixture thereof. Suitable amine curing agents are primary or secondary amines include, but are not limited to, 4,4'-bis-(sec-butylamino)-dicyclohexylmethane; 1,4-bis-(sec-butylamino)-cyclohexane; 3,5-dimehtylthio-2,4(2,6)-toluenediamine; 3,5-diethyl-2,4(2,6)-toluenediamine; N,N'-dialkyldiamine diphenyl methane; 4,4'-diamino-3,3'-diethyl-5,5'-dimethyl diphenylmethane; 2,2', 3,3'-tetrachloro diamino diphenylmethane; trimethylene-glycol-di-p-aminobenzoate; polytetramethyleneoxide-di-p-aminobenzoate; 4,4'-methylene-bis-(2-chloroaniline); 4,4'-methylene-bis-(3-chloro-2,6-diethylaniline) ("MCDEA"); p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); isomers thereof and mixtures thereof. Suitable hydroxyl-terminated curatives are diols, triols, and tetraols that include, but are not limited to, ethylene glycol; diethylene glycol; polyethylene glycol; propylene glycol; polypropylene glycol; polytetramethylene ether glycol; 1,3-bis(2-hydroxyethoxy) benzene; 1,3-bis-[2-(2-hydroxyethoxy) ethoxy] benzene; 1,3-bis-{2-[2-(2-hydroxyethoxy) ethoxy] ethoxy} benzene; 1,3-propane glycol; 1,4-butanediol; 1,5-pentanediol; 1,6-hexanediol; resorcinol-di-(β-hydroxyethyl) ether; hydroquinone-di-(β-hydroxyethyl) ether; and mixtures thereof. Both amine and hydroxyl-terminated curatives can include one or more saturated, unsaturated, halogen, aromatic, cyclic groups. Preferably, the curing agent for the polyurethane cover compositions includes 4,4'-bis-(sec-butylamino)-dicyclohexylmethane (Clearlink® 1000); 1,4-bis-(sec-butylamino)-cyclohexane (Clearlink® 3000); 3,5-dimehtylthio-2,4(2,6)-toluenediamine (Ethacure® 300); 3,5-diethyl-2,4(2,6)-toluenediamine; 1,3-bis(2-hydroxyethoxy) benzene; 1,3-bis-[2-(2-hydroxyethoxy) ethoxy] benzene; 1,3-bis-{2-[2-(2-hydroxyethoxy) ethoxy] ethoxy} benzene; 1,4-butanediol, and mixtures thereof.

In a particularly preferred embodiment of the present invention, saturated ("aliphatic") polyurethanes are used to form cover layers, preferably the outer cover layer. The thermoset polyurethanes may be castable, reaction injection moldable, sprayable, or applied in a laminate form or by any technical known in the art. The thermoplastic polyurethanes may be processed using any number of compression or injection techniques. The cover layers preferably have a Shore D hardness of less than about 72, preferably about 40 to about 72, more preferably about 50 to about 70 and most preferably about 55 to about 65.

It is understood to one of ordinary skill in the art that the NIFP-based compositions described above for forming intermediate layers in golf ball may also be used, in part or in full, to form any of the cover layers in accordance with the present invention. Furthermore, golf ball coating layers may also comprise one or more of the NIFP's disclosed herein.

The multi-layer golf ball of the invention may have an overall diameter of any size. Although the USGA specifications limit the minimum size of a competition golf ball to 1.680 inches in diameter or more, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches. In another alternative embodiment, the golf balls of the present invention have an overall maximum compression of about 90, preferably about 75 to about 85, more preferably about 80 to about 85 and most preferably about 82.

A representative solid core composition in accordance with the present invention comprises an elastomeric polymer ("base rubber"), a crosslinking agent, and a free radical initiator. The base rubber typically includes natural or synthetic elastomers such as natural rubbers; balata; gutta-percha; synthetic polyisoprenes; styrene-butadiene rubbers; styrene-propylene-diene rubbers; chloroprene rubbers; acrylonitrile rubbers; acrylonitrile-butadiene rubbers; ethylenepropylene-diene terpolymers ("EPDM"); metallocene rubbers, and mixtures thereof. The elastomeric composition may also comprise polypropylene resins; partially or fully neutralized ionomer resins; polyamides; polyesters; urethanes; polyureas; thermosetting or thermoplastic elastomers such as Pebax® (AtoFina), Hytrel® (DuPont) and Kraton® (Shell Chemical); styrene-ethylene block copolymers; maleic anhydride or succinate modified metallocene catalyzed ethylene copolymers; chlorinated polyethylenes; polysulfide rubbers; fluorocarbons; and mixtures thereof.

Preferably, the base rubber comprises at least about 40 pph by weight of at least one polybutadiene synthesized with cobalt, nickel, neodymium, and/or lithium catalysts. The polybutadiene preferably has a cis-1,4 content of at least about 90%, more preferably at least about 95%. Also preferably, the polybutadiene has a Mooney viscosity of at least about 30, a molecular weight of at least about 150,000 and a polydispersity of less than about 4.0. The base rubber may comprise a blend of two or more polybutadiene rubbers having different weight percentages, catalysts, molecular weights, Mooney viscosity, polydispersity, filler contents, crosslinking agent contents, or cis- and trans-isomer contents.

The cross-linking agent may be formed from salts of α,β-ethylenically unsaturated carboxylic acids having about 3 to about 8 carbon atoms, such as methacrylic, acrylic, cinnamic, crotonic, formanic and maleic acids. Other cross-linking agents include unsaturated vinyl compounds. More preferably, the cross-linking agent is a mono-(meth)acrylic acid or di-(meth)acrylic acid metal salt, wherein the cation is zinc, sodium, magnesium, or mixtures thereof. Even more preferably, the cross-linking agent is zinc diacrylate ("ZDA"), zinc dimethacrylate ("ZDMA"), or mixtures thereof. Of the common acrylate cross-linkers, ZDA has generally been found to produce golf balls with greater initial velocity than ZDMA, therefore, the former is most preferred. The crosslinking agent may be present in an amount from about 0 to about 70 pph of the base rubber. Base rubbers having little or no ZDA has low water vapor transmission rates. They are less prone to moisture absorption and related deterioration in playability and performance because of the low permeability. On the other hand, high levels of ZDA (greater than about 40 pph) provide desirable increases in initial velocity and COR to the base rubber.

Suitable free radical initiators are typically a peroxide, preferably an organic peroxide, and include without limitation dicumyl peroxide; n-butyl-4,4-di(t-butylperoxy)-valerate; 1,1-bis(t-butylperoxy)-3,3,5-trimethylcyclohexane; α,α'-bis(t-butylperoxy)-diisopropylbenzene; 2,5-dimethyl-2,5-di(t-butylperoxy) hexane; di-t-butyl peroxide; di-t-amyl peroxide; di(2-t-butyl-peroxyisopropyl)benzene peroxide; lauryl peroxide; benzoyl peroxide; t-butyl hydroperoxide; and mixtures thereof. Preferably, the peroxide initiator is dicumyl peroxide. The free radical initiator, at between about 70% and about 100% activity, is preferably added in an amount ranging between about 0.05 and about 15.0 pph by weight of the base rubber. More preferably, the amount of the initiator added ranges between about 0.1 and about 5.0 pph, and most preferably between about 0.25 and about 1.50 pph. The initiator may alternatively or additionally be one or more of electron beams; gamma radiation; infrared radiation; ultraviolet radiation; X-ray radiation; or any other high-energy radiation source capable of generating free radicals. Additives for the free radical initiators include free radical scavengers, scorch retarders, stable free radicals, sulfur-based curing agents with optional accelerators, and mixtures thereof.

The polybutadiene rubber may be mixed with a cis-to-trans catalyst and an optional accelerator during molding to increase resilience and/or decrease compression of the golf ball cores formed therefrom. Suitable materials for the cis-to-trans catalyst and accelerator are disclosed in U.S. Pat. Nos. 6,291,592 and 6,162,135, the disclosures of which are incorporated herein by reference in their entirety. Other core additives well known to the skilled artisan include fillers to adjust the density and/or specific gravity of the core, antioxidants to prevent the breakdown of the base rubber, processing aids, processing oils, plasticizers, dyes and pigments.

In a preferred embodiment, the present invention is directed to an improved multi-layer golf ball which comprises a core, a cover, and at least one intermediate layer disposed between the core and the cover. Preferably, the core has a compression ranging from about 10 to about 100. The core preferably has a diameter of about 1.00 inch to about 1.65 inches, more preferably about 1.25 inches to about 1.60 inches, and most preferably about 1.40 inches to about 1.58 inches. The cover is formed of one or more layers including inner and outer cover layers. It is preferred that a finished golf ball made with such a core has a COR of greater than about 0.75, more preferably about 0.78 to about 0.85 and most preferably about 0.79 to about 0.82.

Manufacturing of the golf balls of the present invention may utilize any conventional processes employed in the golf ball art. For example, the solid cores can be either injection or compression molded. The intermediate layer is subsequently cast, melt extruded, injection molded, compression molded, heat shrink-wrapped, or spin-coated about the core. It is important that the intermediate layer material be able to sustain the temperatures applied during the application of the cover layer. The cover layer or layers are then injection or compression molded or cast about the intermediate layer. The intermediate layers and the cover layers may also be molded around any solid core by a reaction product injection molding process as described in U.S. Pat. Nos. 6,392,002 and 6,371,870, which are incorporated herein, in their entirety, by express reference hereto.

The invention, with respect to golf ball compositions comprising non-ionomeric fluoropolymers will now be described in more detail with respect to the following non-limiting examples:

EXAMPLES

Sample intermediate layers of the present invention were molded over polybutadiene cores having an outer diameter of 1.550 inches, an ATTI compression of 73, and a COR of 0.796. Composition of the cores is: 100 pph polybutadiene rubber (Bayer® CB-23), 25.5 pph zinc diacrylate (Sartomer® SR-526), 0.5 pph peroxide initiator, 5.3 pph zinc oxide, 10.5 pph density-modifying filler (tungsten), 2.0 pph processing aids, and 0.2 pph color pigment. The intermediate layers all had a thickness of 0.035 inches. Compositions of the intermediate layers and their respective performance properties are listed in Table II below.

TABLE II

Golf ball intermediate layers formed of non-ionomeric fluoropolymers

| | Control | Example 1 | Example 2 | Example 3 | Example 4 |
|---|---|---|---|---|---|
| Composition | | | | | |
| Surlyn ® 7940 | 50% | | | | |
| Surlyn ® 8940 | 50% | | | | |
| Kynar Flex ® 2900-04 | | 100% | | | |

TABLE II-continued

Golf ball intermediate layers formed of non-ionomeric fluoropolymers

|  | Control | Example 1 | Example 2 | Example 3 | Example 4 |
|---|---|---|---|---|---|
| Kynar Flex ® 2850-04 | | | 100% | | |
| Kynar Flex ® 3120-10 | | | | 100% | 75% |
| Kynar Flex ® 2950-10 | | | | | 25% |
| Properties | | | | | |
| ATTI Compression | 79 | 80 | 93 | 89 | 83 |
| COR @ 125 ft/s | 0.804 | 0.795 | 0.806 | 0.777 | 0.796 |
| Water Absorption | >0.5% | <0.05% | <0.05% | <0.05% | <0.07% |

According to the data tabulated above, the intermediate layers formed from various non-ionomeric fluoropolymers, Kynar Flex® from Atofina Chemicals, Inc. in particular, significantly reduced the water absorption in the samples in comparison with the Surlyn® ionomer based intermediate layer in the controls. Specifically, the reduction in water absorption was at least one order of magnitude greater. This improvement is desirable in golf balls to prolong their shelf life and to enhance their durability. Other performance properties of the samples were comparable to the controls. In particular, while the ATTI compression of the samples was slightly increased, there was no significant loss in COR.

All patents and patent applications cited in the foregoing text are expressly incorporated herein by reference in their entirety.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a core, a cover, and an intermediate layer disposed between the core and the cover, wherein at least one of the intermediate layer or the cover comprises a non-ionomeric fluoropolymer having a water absorption of less than about 0.07%, the core has a compression of less than about 60, and the intermediate layer has a material hardness greater than that of the cover by at least about 10 shore D.

2. The golf ball of claim 1, wherein the non-ionomeric fluoropolymer has a formula:

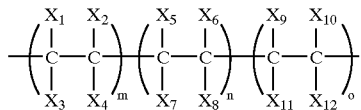

wherein $X_1$ to $X_{12}$ are hydrogen, fluorine, chlorine, bromine, iodine, $CH_3$, $CF_3$, linear or branched alkyl group, partially fluorinated or perfluorinated alkyl group, linear or branched alkoxy group, partially fluorinated or perfluorinated alkoxy group, aromatic, or alicyclic; at least one of $X_1$ to $X_4$ comprises a fluorine; m ranges from 100 to 1 percent by weight of the fluoropolymer; n ranges from 0 to 50 percent by weight of the fluoropolymer and o ranges from 0 to 35 percent by weight of the fluoropolymer.

3. The golf ball of claim 1, wherein the non-ionomeric fluoropolymer is a homopolymer, copolymer, or terpolymer comprising one or more non-ionomeric fluoromonomers.

4. The golf ball of claim 1, wherein the non-ionomeric fluoropolymer is vinylidene fluoride homopolymer, vinylidene fluoride/hexafluoropropylene copolymer, or vinylidene fluoride/hexafluoropropylene/tetrafluoroethylene terpolymer.

5. The golf ball of claim 1, wherein the non-ionomeric fluoropolymer further comprises cure site monomers; ionomeric fluoropolymers, chain transfer agents; peroxide curatives; amine curatives; bisphenol curatives; cross-linking agents; redox initiators; co-curing agents; dispersion fillers; density-modifying fillers; foaming agents; antioxidants; reinforcing agents; plasticizers; lubricants; processing aids; pigments and dyes; and mixtures thereof.

6. The golf ball of claim 1, wherein the intermediate or cover layer further comprises a thermoplastic material comprising polyesterester block copolymers, polyetherester block copolymers, polyetheramide block copolymers, partially or fully neutralized ionomer resins, dynamically vulcanized thermoplastic elastomers, hydrogenated styrene-butadiene elastomers with functional groups attached, thermoplastic polyurethanes, thermoplastic polyesters, metallocene polymers; styrene-propylene-diene rubbers; polybutadienes; chloroprene rubbers; acrylonitrile rubbers; acrylonitrile-butadiene rubbers; ethylene/proprylene/diene terpolymers; polypropylene resins; epoxy; polyurea; styrene-ethylene block copolymers; maleic anhydride or succinate modified metallocene catalyzed ethylene copolymers; chlorinated polyethylenes; polysulfide rubbers; fluorocarbons; polymethylmethacrylate, and mixtures thereof.

7. The golf ball of claim 1, wherein the intermediate or cover layer comprises about 10% to about 75% by weight of the non-ionomeric fluoropolymer, about 0% to about 25% by weight of the thermoplastic material, and about 0% to about 50% by weight of a density-modifying filler.

8. The golf ball of claim 1, wherein the non-ionomeric fluoropolymer has a flexural modulus between about 30,000 psi and about 150,000 psi.

9. The golf ball of claim 8, wherein the non-ionomeric fluoropolymer has a flexural modulus between about 55,000 psi and about 75,000 psi.

10. The golf ball of claim 1, wherein the non-ionomeric fluoropolymer has a material hardness between about 25 and about 75 Shore D.

11. The golf ball of claim 10, wherein the non-ionomeric fluoropolymer of the intermediate layer is between about 50 and about 70 Shore D.

12. The golf ball of claim 1, wherein the intermediate or cover layer has a thickness between about 0.005 inches and about 0.085 inches.

13. The golf ball of claim 12, wherein the intermediate or cover layer has a thickness between about 0.030 inches and about 0.060 inches.

14. The golf ball of claim 1, wherein the golf ball core has an outer diameter between about 1.500 inches and about 1.650 inches.

15. The golf ball of claim 1, wherein the golf ball core has an outer diameter between about 1.550 inches and about 1.640 inches.

16. The golf ball of claim 1, wherein the intermediate or cover layer comprises a density-reducing filler, and wherein the intermediate or cover layer has a specific gravity ranging from about 0.90 to about 1.50.

17. The golf ball of claim 1, wherein the core comprises a center and at least one outer core layer.

18. The golf ball of claim 17, wherein the at least one outer core layer comprises a non-ionomeric fluoropolymer.

19. The golf ball of claim 17, wherein the center is solid, hollow, liquid-filled, gel-filled, or gas-filled.

20. The golf ball of claim 17, wherein the outer core layer is a wound layer.

21. The golf ball of claim 1, wherein the cover comprises an outer cover layer and at least one inner cover layer.

22. The golf ball of claim 1, wherein the intermediate layer comprises the non-ionomeric fluoropolymer and the cover comprises a thermoplastic or thermosetting material comprising partially or fully neutralized ionomer resins; epoxy; polyurethanes; balata; vinyl resins; polyolefins; polyureas; polyamides; acrylic resins and blends thereof; block copolymers; copoly(ether-amide); polyphenylene oxide resins and blends thereof; thermoplastic polyesters; and mixtures thereof.

23. The golf ball of claim 1, wherein the core has a Shore D hardness of less than about 60.

24. The golf ball of claim 1, wherein the cover comprises at least one additive comprising antioxidants; catalysts; colorants including pigments and dyes; hindered amine light stabilizers; optical brighteners; UV absorbers; fillers; metals; plasticizers; surfactants; viscosity modifiers; compatibility agents; dispersing agents; foaming agents; reinforcement agents; release agents; and mixtures thereof.

* * * * *